May 28, 1963     D. H. BALLARD ETAL     3,091,257
AIR SUSPENSION SYSTEMS FOR VEHICLES
Filed Aug. 29, 1960                    2 Sheets-Sheet 1
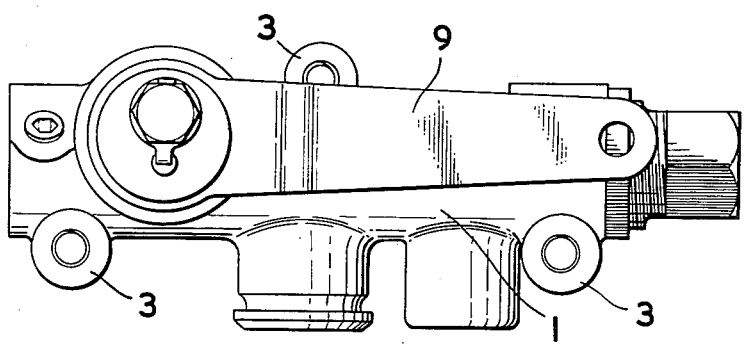
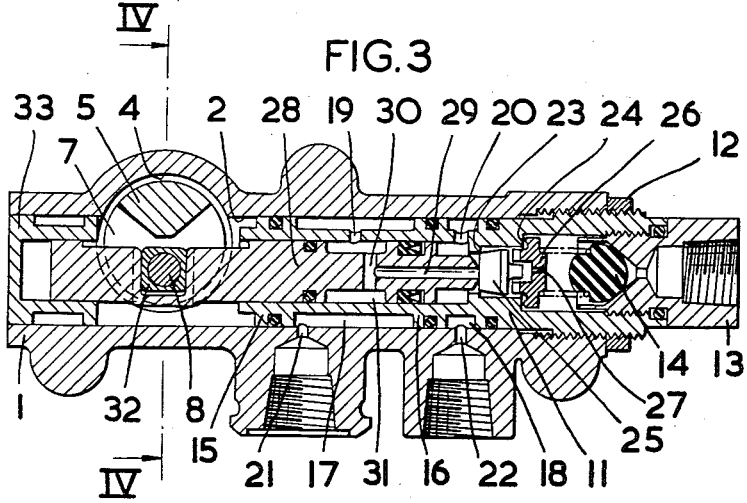
INVENTORS
DONALD HENRY BALLARD
ALBERT EDWARD ELLIS
By: Norris + Bateman
         Attorneys May 28, 1963     D. H. BALLARD ETAL     3,091,257
AIR SUSPENSION SYSTEMS FOR VEHICLES
Filed Aug. 29, 1960     2 Sheets-Sheet 2
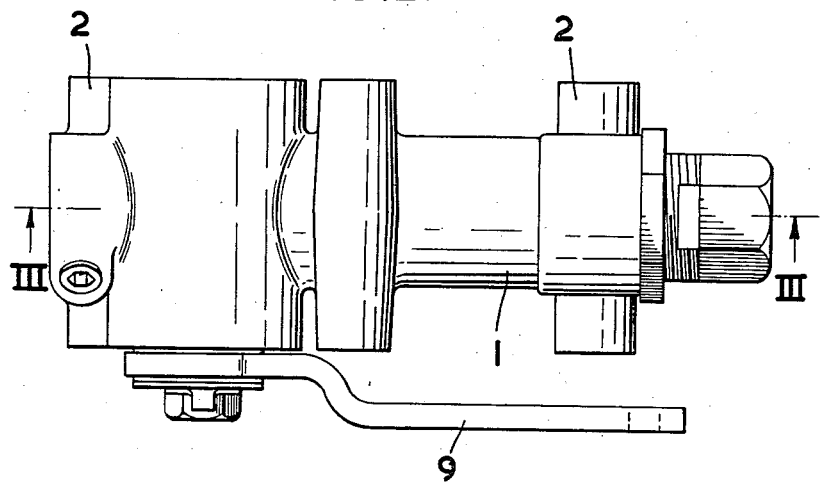
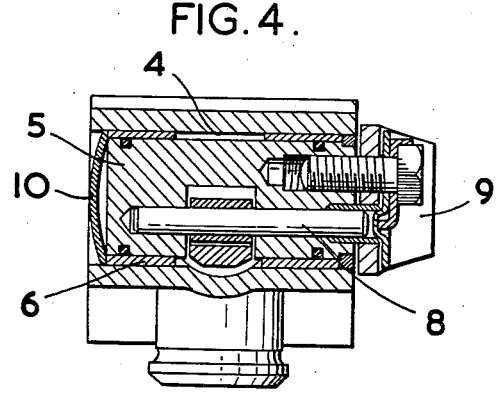
INVENTORS
DONALD HENRY BALLARD
ALBERT EDWARD ELLIS
By: Norris & Bateman
Attorneys United States Patent Office 3,091,257
Patented May 28, 1963

3,091,257
AIR SUSPENSION SYSTEMS FOR VEHICLES
Donald H. Ballard, Lincoln, England, and Albert E. Ellis, Wadeville, Germiston, Republic of South Africa, assignors to Clayton Dewandre Company, Limited, Lincoln, England
Filed Aug. 29, 1960, Ser. No. 52,569
Claims priority, application Great Britain Aug. 28, 1959
2 Claims. (Cl. 137—627.5)

This invention relates to air suspension systems for vehicles and particularly to levelling valves as used in such systems to control the flow of air to and from the air springs, said valves being actuated by relative movement of the vehicle frame or chassis and a wheel axle.

Such levelling valves are usually made fast to the vehicle frame and include an operating arm or lever coupled, preferably by an adjustable rod or link, to the wheel axle, and the present invention provides an improved valve of this type which is of simple and compact construction thereby facilitating production, installation and servicing.

According to the invention the improved levelling valve comprises a housing accommodating valve means including a longitudinally-movable valve element controlling air flow between ports connected respectively to the air supply, to an air spring and to exhaust, and rotary cam, crank or like means extending transversely through and journalled in the housing and carrying the operating arm or lever externally of the housing, said valve element or an extension thereof having an operable connection with said cam or like means.

Reference will now be made to the accompanying drawings which illustrate a preferred embodiment of the invention and wherein FIG. 1 is a side elevation of the valve,
FIG. 2 is a plan view thereof,
FIG. 3 is an axial section on the line III—III of FIG. 2 and
FIG. 4 is a cross section on the line IV—IV of FIG. 3.

As shown, the housing 1 is an elongated structure having a bore 2 extending longitudinally and completely therethrough and embodying tapped lugs 3 or equivalent means by which it may be bolted to a vehicle frame or chassis. Located in one end of the bore is a valve mechanism more fully described hereafter while towards the other end of the housing the latter is provided with a transversely-extending bore 4 adapted to receive a valve-actuating crank member. This member consists of a cylindrical plug 5 rotatably mounted within the bore 4 with the aid of a thin sleeve bearing 6, the plug being slotted radially at a point intermediate its ends to define a pocket 7 across which extends a spindle 8 supported within the plug in a position parallel to the plug axis to constitute a crank pin. The operating arm or lever 9 is bolted directly to one end of the plug 5, the other end thereof being enclosed by a detachable disc 10 or other cover and the arrangement being such that the plug may be reversed in the bore to adapt the valve to right hand or left hand actuation as desired.

The valve shown is of known construction and comprises a sleeve member 11 fixedly located within the longitudinal bore of the housing by a screw-thread connection and locknut 12 and closed at its outer end by a ported cap 13 adapted to be connected to the air supply, said cap accommodating a spring-loaded, ball-type, non-return valve 14 controlling air flow through the cap. The opposite or inner end portion of the sleeve 11 is of smaller diameter than the outer end portion and is provided with two spaced lands 15, 16 defining with said outer end portion two peripheral grooves 17, 18 connected by ports 19, 20 with the interior of the sleeve. These two peripheral grooves lap ports 21, 22 in the housing wall leading respectively to atmosphere (exhaust) and to the associated air spring. Inwardly of the end cap 13, the sleeve 11 is shaped to define two axially-spaced annular seatings 23, 24, disc valves 25, 26 being provided to co-operate with these seatings and the outermost disc element 26 having a small orifice 27 extending therethrough. Having a sliding fit within the sleeve is a spool type valve element 28 having at its forward end an axial bore 29 terminating in a transverse passage 30 which opens into a circumferential groove 31 in the valve element, the other end of the valve element extending through the radial slot 7 in the rotary plug 5 and in this region being recessed or slotted to receive with close fit a bush 32 rotatable on the crank pin 8. Beyond the rotary plug, the valve element is guided for axial sliding movement by a second sleeve 33 providing a closure to that end of the housing bore.

The valve operates as follows:

With the system under balanced conditions, the disc valves 25, 26 engage their seatings as shown to close off the inlet port while the inner end of the valve element 28 engages the innermost disc valve 25, which is preferably of a resilient material, to close the bore 29 in said valve element and thereby the connection to the exhaust port 21. Deflections of the operating arm 9 under changes in riding height impart rotation to the plug member 5 and the crank pin 8 displaces the valve element 28 axially. Small deflections displace only the innermost disc valve 25 whereby a limited air flow is permitted through the orifice 27 in the other disc, but larger deflections, after effecting abutment of the two disc elements, lift the two together so permitting more rapid inflow of air. Movement of the valve element in the opposite direction effects an uncovering of the end of the bore 29 to establish connection between the air spring and the exhaust port.

It will be understood that the above-described valve is given by way of example only and may be substituted by any other form of axially-displaceable valve.

We claim:

1. A leveling valve for use in a vehicle air suspension system comprising a housing having an inlet port at one end for air under pressure and an inlet passage connected to said inlet port provided with axially spaced valve seats, a valve element for each seat, a slidable spool valve member in said housing having one end in abutment with one of said valve elements, means defining an exhaust passage and an air spring passage in said housing, said inlet passage leading to said air spring passage and being valved by said elements, a bore in said spool valve element closed at one end by said abutment with said one valve element and open at its other end to the exhaust passage, an operating arm pivoted on the housing and operatively connected to said spool valve, so that as said arm is moved in one direction it successively displaces said elements from said valve seats and when moved in the other direction it opens said one end of the bore to connect said air spring passage to exhaust, the pivotal mounting of said operating arm comprising a rotatable member journaled at axially spaced portions on said housing and the connection of said rotatable member to said spool valve member being a crank connection disposed between said journaled portions, and means axially slidably mounting longitudinally spaced portions of said spool valve member in said housing at opposite sides of said crank connection so that said crank connection is longitudinally disposed between two slidably mounted portions of said spool valve member.

2. A leveling valve for use in a vehicle air suspension system comprising a housing having a longitudinal bore closed at one end, a sleeve fixedly mounted in the other end of said bore, means in the outer end of sleeve defining an inlet port for air under pressure, means defining an axial inlet passage from said inlet port through said sleeve provided with axially spaced valve seats, valve elements on said seats, cooperating means on the sleeve and housing defining in said bore axially spaced air spring and exhaust passages, a spool valve slidably mounted in said sleeve and having one reduced end extending into abutment with one of said valve elements, said spool valve having an annular surface recess, a radial opening in said sleeve connecting said recess with said exhaust passage, an axial bore in said spool valve open at its inner end to said recess and closed at its outer end by said abutment with said one valve element, there being a further passage formed within the sleeve around said reduced outer end of said spool and an opening through the sleeve connecting said further passage to said air spring passage and an operating arm pivoted on the housing and extending into the housing bore to be operatively connected to said valve spool inwardly of the inner end of said sleeve whereby as said arm is moved in one direction it successively displaces said valve elements from said valve seats and when moved in the other direction it opens the inner end of the spool valve bore to connect said air spring passage to exhaust.

References Cited in the file of this patent
UNITED STATES PATENTS

| | | |
|---|---|---|
| 2,733,931 | Reid et al. | Feb. 7, 1956 |
| 2,942,623 | Schwartz | June 28, 1960 |
| 2,947,532 | Christensen | Aug. 2, 1960 |
| 2,967,064 | Valentine | Jan. 3, 1961 |